J. M. McDERMOTT.
AUTO TRANSPORTING DEVICE.
APPLICATION FILED MAR. 17, 1920.
1,375,403.
Patented Apr. 19, 1921.
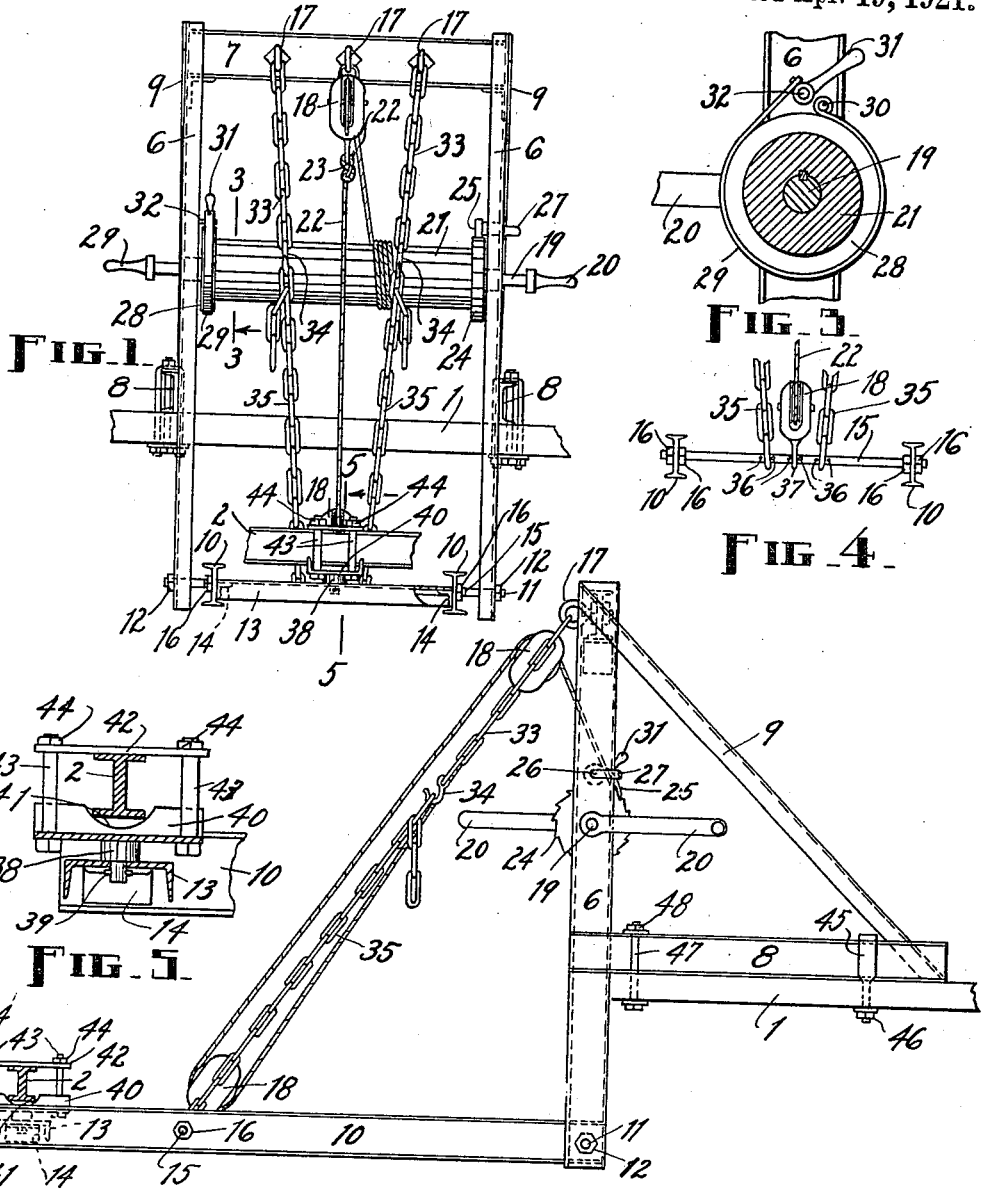
WITNESS:
C. C. West
INVENTOR.
James M. McDermott,
BY
Frank A. Cutter,
ATTORNEY.

UNITED STATES PATENT OFFICE.

JAMES M. McDERMOTT, OF SPRINGFIELD, MASSACHUSETTS.

AUTO-TRANSPORTING DEVICE.

1,375,403.   Specification of Letters Patent.   Patented Apr. 19, 1921.

Application filed March 17, 1920. Serial No. 366,497.

*To all whom it may concern:*

Be it known that I, JAMES M. McDERMOTT, a citizen of the United States of America, and a resident of Springfield, in the county of Hampden and State of Massachusetts, have invented a new and useful Auto-Transporting Device, of which the following is a specification.

My invention relates to improvements in devices or attachments with which disabled motor vehicles or automobiles can be connected with a truck and drawn away to be repaired, and resides in a frame of special construction that is designed to be securely attached to or at the rear end of the chassis of a motor truck, said frame being provided with pivotally-connected arms, hoisting and securing means and mechanism for said arms and their load, and certain peculiar attaching means for the axle of an automobile together with such subsidiary and auxiliary parts and members as may be needed or desired in order to render the device or attachment complete, all as hereinafter set forth.

As is well known, whenever an automobile becomes disabled on the road it is the common custom to go after it with an auto truck, fasten one or the other of the axles of the damaged machine to said truck, and then by means of the latter draw said machine to a garage. The principal difficulty involved in this procedure heretofore has been that suitable connection or attachment between the truck and the automobile could only be made after raising from the ground the end of the automobile that had to be fastened to the truck, the aid of three or four men frequently being required. The primary object of my invention is to remove this difficulty by providing a device or appliance with which one man can make the necessary attachment and tow in the machine alone, and do it with less effort than that required in the old way.

A further object is to produce a device or attachment of this character which is comparatively inexpensive, simple both in construction and operation, strong, durable, safe, secure, and convenient, and which also is capable of being readily attached to an auto truck.

Another object is to provide means in such a device for making a suitable and proper direct connection with an automobile axle, and for maintaining such connection while the automobile is being propelled by means or through the medium of said device.

Other objects and advantages will appear in the course of the following description.

I attain the objects and secure the advantages of my invention by the means and mechanism illustrated in the accompanying drawings, in which—

Figure 1 is a rear elevation of an auto-transporting device that embodies a practical form of my invention, a portion of the foremost reach of the hoisting cable being broken out to disclose the connection between one end of said cable and the bottom of the upper pulley block; Fig. 2, a side elevation of said device; Fig. 3, an enlarged detail of the brake and associated parts taken on lines 3—3, looking in the direction of the associated arrow, in Fig. 1; Fig. 4, a detail of the arms and certain other connections or connected parts, as viewed from the rear, and, Fig. 5, an enlarged detail of the swivel bolster for the automobile axle, taken on lines 5—5, looking in the direction of the associated arrow, Fig. 1.

Similar reference numerals designate similar parts throughout the several views.

In Figs. 1 and 2 a portion of the rear end of an auto-truck chassis is represented at 1; and in said views and Fig. 5 a portion of an axle, which may be assumed to be either the front or rear axle of a disabled automobile, is represented at 2. A portion of the connecting member at the rear ends of the arms of the attachment is broken out at one end in Fig. 1, to disclose more clearly the construction. The ground line is represented at 4 in Fig. 2.

The main frame of the device as herein illustrated consists of vertical side pieces 6—6 connected at the top by a horizontal cross beam 7, a pair of forwardly-extending arms 8 which are rigidly attached to said side pieces or sides, and a pair of braces 9 extending between said sides at their upper terminals and said arms at their forward terminals. A pair of rearwardly-extending arms 10 is pivotally connected at 11 with the sides 1, the pivot rod passing through said sides adjacent to their bottom ends, and through said arms adjacent to their front ends, and being held in place by nuts 12—12 outside of the side pieces. The arms 8 are some little distance above the rod 11. A horizontal cross-beam 13 extends between the arms 10 adjacent to their rear ends and is rigidly attached to said arms. In the present case the beam 13 consists of an inverted channel-iron, and angle-irons 14 are employed at the ends to secure said channel-iron to said arms. A rod 15 extends through the arms 10 forward of and some distance from the beam 13, being held in place by nuts 16—16.

Depending from an eye 17 in the center of the back side of the beam 7 is a pulley block 18, and having its lower end attached to the rod 15 in the center is another pulley block 18. A horizontal shaft 19 is journaled in the sides 1 above the arms 8, and is provided at each end with a crank 20, two cranks being furnished for the sake of convenience. Secured on the shaft 19 is a winding drum 21. One end of a cable 22 is attached to the bottom of the upper pulley block 18, as shown at 23 in Fig. 1, and from said block said cable extends downwardly and rearwardly to and through the lower pulley block 18, then upwardly and forwardly to and through said upper block, and finally downwardly and forwardly to the drum 21 to which the other end of said cable is attached and upon which the latter is wound.

At one end of the winding drum 21 is a ratchet-wheel 24, and for this a pawl 25 is provided. The pawl 25 is at the inner end of a short spindle 26 journaled in the adjacent side piece 1 and having a handle 27 thereon outside of said side piece. By means of the handle 27 and the spindle 26, the pawl 25, which normally rests and rides at its free end on the ratchet-wheel 24, can be raised out of engagement with said wheel. The pawl 25 operates like any ordinary pawl normally to prevent the ratchet-wheel 24 and the drum 21 from revolving or being revolved except in one direction, such direction being that necessary when the cable 22 is wound on said drum.

At the other end of the drum 21 is a brake wheel 28, and for this is provided a brake-band 29. One end of the brake-band 29 is fastened to a stud 30 on the inside of the adjacent side piece 1, and the other end of said band is fastened to a handle 31 which is mounted on a stud 32 also on the inside of said side piece. The arrangement of parts is such that downward pressure on the handle 31 applies the brake-band 29 to the wheel 28 and so checks or stops the rotation of the drum 21.

Both the ratchet and brake devices are of ordinary construction and operate in the usual manner.

Upon winding the cable 22 on the drum 21 the arms 10 are swung upwardly on the pivot rod 11, and upon releasing said drum, so as to permit said cable to unwind therefrom, said arms are permitted to swing downwardly on said rod, as will be readily seen.

In order to provide a strong and positive support for the arms and so relieve the ratchet from strain and guard against possible accident due to the slipping of the hoisting mechanism or the breaking of any part thereof, a pair of supporting cables is provided. There are additional eyes 17, one each side of the central eye 17, to accommodate the aforesaid cables. Each of these cables here consists of a length of chain 33 which is attached at the top to one of the outer eyes 17, and has a hook 34 at the bottom, and a length of chain 35 which is attached to the rod 15 on one side or the other of the lower pulley block 18 and adapted to have any of its links engaged with said hook. The chains 33 and 35 when hooked together afford supports for the arms 10 and their load which are sufficiently strong to carry the entire load without the aid of the hoisting mechanism with its ratchet. By lengthening or shortening the supporting portions of the chains 35, through the medium of the links at the upper terminals of said chains and with the aid of the hooks 34, these chains with the chains 33 can be arranged to support the arms 10 with their load at any angle at which said arms may be positioned. To unhook the chains 35 from the chains 33 it is necessary to wind up the cable 22 on the drum 21 to an extent sufficient to swing said arms upwardly far enough to enable said first-named chains to be released from the hooks 34. If desired three pairs of pins 36 may be employed to prevent the attaching member (37) at the bottom of the lower pulley block 18 and the chains 35 from slipping laterally on the rod 15, as shown in Fig. 4, said pins being inserted in said rod and extending in both directions from the front and back sides thereof.

Having its head resting and adapted to rotate on and its shank entered in an opening in the center of the beam 13 is a swivel 38. A transverse pin 39 is passed through the shank of the swivel 38 below the top part of the beam 13 to prevent said swivel from being displaced upwardly. A short length of channel-iron is mounted on and secured to the top of the swivel 38 to form a bolster 40. Each side of the bolster 40 is cut out in the center at 41 to receive the axle 2 or any other axle, the bottom of such cut-out portion or recess being above the level or plane of the tops of the arms 10, so as to support said axle without contact with said arms, provided the axle be horizontally disposed. Any rocking movement of the axle is limited by the arms 10 and must be comparatively slight. Thus it is possible to support the axle clear of the arms 10 or while resting on one arm only, so that there is no serious interference with the turning movement of the parts and the action necessary when turning corners. The bolster 40 normally stands approximately crosswise of the beam 13.

Suitable means should be provided for fastening the axle to the bolster 40, and such means may consist of two plates or straps 42, and two pairs of bolts 43 and nuts 44. After the bolster 40 has been introduced beneath the axle, the bolts 43 are passed upwardly through openings provided for them in the bottom of said bolster, the straps 42 are placed over said axle and said bolts, and the nuts 44 are screwed tightly into place on said bolts, thus securely clamping the axle between the bolster and straps. It is necessary, of course, to remove the nuts 44, the straps 42, and the bolts 43 before disengaging the bolster 40 from the axle.

When in operative position the attachment is arranged with the sides 6 against the rear end of the chassis 1, and the arms 8 on said chassis. Some means must be provided for securing the arms 8 to the chassis 1, and to this end I may employ a clip 45 with nuts 46 and a bolt 47 with a nut 48 for each of said arms. Each clip 45 extends over and downwardly on both sides of its arm 8, at a point adjacent to the brace 9 which is attached to said arm, and through the chassis 1 to receive two of the nuts 46; and each bolt 47 extends upwardly through said chassis and arm, at a point adjacent to the side 1 to which said arm is attached, to receive one of the nuts 48. Washers may be used with the nuts in this and in all other cases if desired.

In practice, the truck with the attachment is backed up to the vicinity of the automobile which it is desired to convey away, the chains 33 are unhooked from the chains 35, the pawl 25 is raised out of engagement with the ratchet-wheel 24, and the cable 22 is permitted to unwind from the drum 21, the rotation of the latter being controlled by the brake if necessary. This permits the arms 10 to swing downwardly and they continue until their rear ends just clear the ground. Then the pawl 25 is permitted to engage the ratchet-wheel 24. The truck is now backed further until the bolster 40 is beneath the axle of the automobile which is in position to be engaged or connected with said bolster. The drum 21 is next rotated to wind up the cable 22 until the bolster 40 is brought tightly against the underside of the axle, when further rotation of said drum is discontinued until the straps 42, bolts 43 and nuts 44 are applied to secure said axle to said bolster. Finally the drum 21 is again rotated to elevate or swing upwardly the arms 10, and said arms are secured in raised position by again connecting the chains 33 and 35. The connected part of the automobile is thus raised and supported a sufficient distance from the ground to enable the automobile to travel on the rear pair of wheels when the truck is driven either forwardly or backwardly. As hereinbefore observed, it is immaterial which end of the automobile is connected with the attachment. The truck is now driven to the locality where it is desired to leave the automobile, the arms 10 are raised sufficiently to enable the chains to be unhooked, which is done, and then the drum 21 permitted to rotate under the control of the brake in the direction to unwind the cable 22. In unwinding the cable 22 permits the arms 10 to swing downwardly to the extent required for disconnecting the axle, the latter is disconnected, said arms are lowered a little farther or sufficiently to enable the bolster 40 to be withdrawn from beneath said axle, and the truck is finally driven forward to take the attachment entirely out of the way of the automobile.

From the foregoing brief description of the operation of the attachment as a whole, taken in connection with the preceding description of the construction and operation of the parts in detail, the manner in which the attachment is used or may be used will be clearly understood.

The cranks 20, pawl handle 27, and brake handle 31 can be operated either from the chassis 1 or from the ground.

In some cases the supporting chains may be omitted.

The arms 10 with their rear-end connecting beam 13 may properly be termed a lifter.

More or less change or modification in the size, shape, construction, and arrangement of some or all of the parts of this device may be made without departing from the spirit of my invention, or exceeding the scope of what is claimed.

What I claim as my invention, and desire to secure by Letters Patent, is—

1. The combination, in an auto-transporting device, with a frame attachable to the rear end of a truck, and a lifter pivotally connected at the front end with said frame at the bottom, of means to support said lifter from said frame with the rear end of said lifter at different elevations from the ground.

2. The combination, in an auto-transporting device, with a frame attachable to the rear end of a truck, and a lifter pivotally connected at the front terminal with said frame at the bottom, of hoisting mechanism carried by said frame for said lifter, and means apart from said hoisting mechanism to support said lifter from said frame with the rear end of the lifter at different elevations from the ground.

3. The combination, in an auto-transporting device, with a frame attachable to the rear end of a truck, a lifter pivotally connected at the front terminal with said frame at the bottom, and receiving means for an axle at the rear end of said lifter, of hoisting mechanism carried by said frame for said lifter.

4. The combination, in an auto-transporting device, with a frame attachable to the rear end of a truck, a lifter pivotally connected at the front terminal with said frame at the bottom, and swivel receiving means for an axle at the rear end of said lifter, of hoisting mechanism carried by said frame for said lifter.

5. The combination, in an auto-transporting device, with a frame attachable to the rear end of a truck, a lifter pivotally connected at the front terminal with said frame at the bottom, and receiving and attaching means for an axle at the rear end of said lifter, of hoisting mechanism carried by said frame for said lifter.

6. The combination, in an auto-transporting device, with a frame attachable to the rear end of a truck, a lifter pivotally connected at the front terminal with said frame at the bottom, and swivel receiving and attaching means for an axle at the rear end of said lifter, of hoisting mechanism carried by said frame for said lifter.

7. The combination, in an auto-transporting device, with a frame attachable to the rear end of a truck, and a lifter pivotally connected at the front terminal with said frame at the bottom, of a winding drum mounted in said frame, anti-friction members attached to said frame and lifter, a cable attached to one of said anti-friction members and said drum and passing under and over said anti-friction members, and means to control said drum.

8. The combination, in an auto-transporting device, with a frame attachable to the rear end of a truck, and a lifter pivotally connected at the front terminal with said frame at the bottom, of a winding drum mounted in said frame, anti-friction members attached to said frame and lifter, a cable attached to one of said anti-friction members and said drum and passing under and over said anti-friction members, and a ratchet provided for said drum.

9. The combination, in an auto-transporting device, with a frame attachable to the rear end of a truck, and a lifter pivotally connected at the front terminal with said frame at the bottom, of a winding drum mounted in said frame, anti-friction members attached to said frame and lifter, a cable attached to one of said anti-friction members and said drum and passing under and over said anti-friction members, and a ratchet and brake provided for said drum.

10. The combination, in an auto-transporting device, with a frame attachable to the rear end of a truck, and a lifter pivotally connected at the front terminal with said frame at the bottom, of a winding drum mounted in said frame, anti-friction members attached to said frame and lifter, a cable attached to one of said anti-friction members and said drum and passing under and over said anti-friction members, and a cable extending between said frame and lifter to support the latter independently of the hoisting mechanism which includes said first-named cable, said second-named cable being provided with means to lengthen and shorten the same.

11. The combination, in an auto-transporting device, with a frame attached to the rear end of a truck, a lifter pivotally connected at the front terminal with said frame at the bottom, a swivel carried at the rear end of said lifter, and a bolster mounted on said swivel.

12. The combination, in an auto-transporting device, with a frame attachable to the rear end of a truck, a lifter pivotally connected at the front terminal with said frame at the bottom, a swivel carried at the rear end of said lifter, a bolster mounted on said swivel and means to secure an axle to said bolster.

13. The combination, in an auto-transporting device, with a frame attachable to the rear end of a truck, a lifter pivotally connected at the front terminal with said frame at the bottom, a swivel carried at the rear end of said lifter, a bolster mounted on said swivel, a strap to extend over an axle supported by said bolster, bolts passing through said bolster and said strap, and nuts for said bolts.

JAMES M. McDERMOTT.

Witnesses:
A. C. FAIRBANKS,
F. A. CUTTER.